(12) United States Patent
Schultz et al.

(10) Patent No.: US 9,477,241 B2
(45) Date of Patent: Oct. 25, 2016

(54) HVAC CONTROLLER WITH PROXIMITY BASED MESSAGE LATENCY CONTROL

(71) Applicant: Honeywell International Inc., Morristown, NJ (US)

(72) Inventors: David Schultz, Savage, MN (US); Devin Diedrich, Ramsey, MN (US)

(73) Assignee: Honeywell International Inc., Morris Plains, NJ (US)

( * ) Notice: Subject to any disclaimer, the term of this patent is extended or adjusted under 35 U.S.C. 154(b) by 349 days.

(21) Appl. No.: 14/088,278

(22) Filed: Nov. 22, 2013

(65) Prior Publication Data

US 2015/0148964 A1    May 28, 2015

(51) Int. Cl.
G05D 23/19    (2006.01)
F24F 11/00    (2006.01)

(52) U.S. Cl.
CPC ....... G05D 23/1905 (2013.01); F24F 11/0034 (2013.01); *F24F 2011/0075* (2013.01)

(58) Field of Classification Search
CPC ............ G05D 23/1905; F24F 11/0034; F24F 2011/0075
USPC .......................................................... 700/276
See application file for complete search history.

(56) References Cited

U.S. PATENT DOCUMENTS

| | | | |
|---|---|---|---|
| 7,127,734 B1 | 10/2006 | Amit | |
| 7,130,719 B2 | 10/2006 | Ehlers et al. | |
| 7,155,305 B2 | 12/2006 | Hayes et al. | |
| 7,159,789 B2 | 1/2007 | Schwendinger et al. | |
| 7,257,397 B2 | 8/2007 | Shamoon et al. | |
| 7,451,017 B2 | 11/2008 | McNally | |
| 7,457,973 B2 | 11/2008 | Liu | |
| 7,510,126 B2 | 3/2009 | Rossi et al. | |
| 7,668,532 B2 | 2/2010 | Shamoon et al. | |
| 7,746,242 B2 | 6/2010 | Schwendinger et al. | |
| 7,949,615 B2 | 5/2011 | Ehlers et al. | |
| 8,127,158 B2 | 2/2012 | Jessup et al. | |
| 8,255,090 B2 | 8/2012 | Frader-Thompson et al. | |
| 8,332,055 B2 | 12/2012 | Veillette | |
| 8,350,697 B2 | 1/2013 | Trundle et al. | |

(Continued)

FOREIGN PATENT DOCUMENTS

CA    2818546    5/2012
CN    102629128    8/2012

(Continued)

OTHER PUBLICATIONS

International Search Report for PCT Application No. PCT/US2010/042589, 4 pages, mailed Nov. 22, 2010.

(Continued)

*Primary Examiner* — Carlos Ortiz Rodriguez
(74) *Attorney, Agent, or Firm* — Seager, Tufte & Wickhem, LLP

(57) ABSTRACT

Message latency between an HVAC controller located within a building and a remote server may be reduced in response to a determination that a user is in proximity to the HVAC controller, and message latency may be increased when a user is not expected to be proximity to the HVAC controller. This may reduce the overall power consumption of an HVAC controller while still maintaining a good user experience. This can be particularly important for HVAC controllers that are powered by a local energy storage device, such as a battery.

21 Claims, 5 Drawing Sheets

(56) References Cited

U.S. PATENT DOCUMENTS

| | | |
|---|---|---|
| 8,390,473 B2 | 3/2013 | Krzyzanowski et al. |
| 8,412,654 B2 | 4/2013 | Montalvo |
| 8,560,128 B2 | 10/2013 | Ruff et al. |
| 8,571,518 B2 | 10/2013 | Imes et al. |
| 8,587,445 B2 | 11/2013 | Rockwell |
| 8,634,788 B2 | 1/2014 | Wright et al. |
| 2002/0147006 A1 | 10/2002 | Coon et al. |
| 2005/0172056 A1 | 8/2005 | Ahn |
| 2006/0063522 A1 | 3/2006 | McFarland |
| 2006/0097063 A1 | 5/2006 | Zeevi |
| 2007/0037605 A1 | 2/2007 | Logan |
| 2007/0249319 A1 | 10/2007 | Faulkner et al. |
| 2009/0327390 A1 | 12/2009 | Tran et al. |
| 2010/0034386 A1 | 2/2010 | Choong et al. |
| 2010/0261465 A1 | 10/2010 | Rhoads et al. |
| 2011/0022242 A1 | 1/2011 | Bukhin et al. |
| 2012/0036261 A1 | 2/2012 | Salazar et al. |
| 2012/0130548 A1 | 5/2012 | Fadell et al. |
| 2012/0179300 A1 | 7/2012 | Warren et al. |
| 2012/0256009 A1 | 10/2012 | Mucignat et al. |
| 2012/0259476 A1 | 10/2012 | Trieb et al. |
| 2012/0267089 A1 | 10/2012 | Mucignat et al. |
| 2013/0024799 A1 | 1/2013 | Fadell et al. |
| 2013/0035884 A1 | 2/2013 | Burke et al. |
| 2013/0065584 A1 | 3/2013 | Lyon et al. |
| 2013/0103204 A1 | 4/2013 | Stefanski et al. |
| 2013/0173064 A1* | 7/2013 | Fadell ............... G05D 23/1902 700/276 |
| 2014/0004945 A1 | 1/2014 | Griffin |
| 2015/0045959 A1* | 2/2015 | McPherson ........ G05D 23/1917 700/276 |

FOREIGN PATENT DOCUMENTS

| | | |
|---|---|---|
| EP | 2051221 | 1/2011 |
| WO | 2009034720 | 3/2009 |
| WO | 2009067251 | 5/2009 |
| WO | 2013058820 | 4/2013 |

OTHER PUBLICATIONS

U.S. Appl. No. 61/179,224, filed May 18, 2009.
U.S. Appl. No. 14/088,301, filed Nov. 22, 2013.
Gupta, "A Persuasive GPS-Controlled Thermostat System," 89 pages, Massachusettes Institute of Technology, Sep. 2008.
GreenBox, "Insightful & Effortless Smart Energy Systems," 3 pages, printed Apr. 3, 2013.
Jung et al., "User-Profile-Driven Collaborative Bandwidth Sharing on Mobile Phones," MCS '10, 9 pages, Jun. 15, 2010.

* cited by examiner

HVAC CONTROLLER WITH PROXIMITY BASED MESSAGE LATENCY CONTROL

TECHNICAL FIELD

The present disclosure relates generally to HVAC systems, and more particularly to HVAC controllers that accommodate and/or facilitate control of an HVAC system from a remote location.

BACKGROUND

Heating, ventilation, and/or air conditioning (HVAC) systems are often used to control the comfort level within a building or other structure. Such HVAC systems typically include an HVAC controller that controls various HVAC components of the HVAC system in order to affect and/or control one or more environmental conditions within the building. In some cases, a user may be able to affect the operation of an HVAC system from a remote location, such as via a web site or an application program (also referred to as an "app") provided on a remote device such as, for example, a user's smart phone. What would be desirable are methods and systems for improving the reliability and/or user experience of such a system, particularly when the HVAC controller is powered by a local power source such as a battery.

SUMMARY

The present disclosure relates to generally to HVAC systems, and more particularly to HVAC controllers that accommodate and/or facilitate control of an HVAC system from a remote location. In one illustrative embodiment, a building controller may include: an input/output block configured to send one or more control signals to control one or more building components; a communications port configured to send and/or receive messages via a communications network; a user interface; a sensor used to determine if a user is in proximity to the building controller; and a controller operatively coupled to the input/output block, the communications port, the user interface and the sensor. In some cases, the controller can be configured to communicate via the communications port, wherein: when the sensor detects that a user is in proximity to the building controller, a first message latency occurs from when a user interacts with a remote device to interact with the building control device and when a message corresponding to that user interaction at the remote device is communicated to the building controller; and when the sensor does not detect that a user is in proximity to the building controller, a second message latency occurs from when a user interacts with a remote device to interact with the building control device and when a message corresponding to that user interaction at the remote device is communicated to the building controller. The second message latency is longer than the first message latency. In some cases, a first message latency may occur from when a user interacts with the user interface of the building controller and when a message corresponding to that user interaction at the building controller is communicated to a remote device.

In another illustrative embodiment, a method for reducing power consumption of a building controller can include: determining if a user is expected to be in proximity to the building controller, wherein: when it is determined that a user is expected to be in proximity to the building controller, a first message latency occurs from when a user interacts with the remote device and when a message corresponding to that user interaction at the remote device is communicated to the building controller; and when it is determined that a user is not expected to be in proximity to the building controller, a second message latency occurs from when a user interacts with a remote device and when a message corresponding to that user interaction at the remote device is communicated to the building controller, wherein the second message latency is longer than the first message latency. In many cases, the building controller is configured to be manipulated by a user from a remote device by receiving one or more messages that correspond to user interaction at the remote device.

In yet another illustrative embodiment, a computer readable medium comprising a set of instructions stored thereon in a non-transitory state, the instructions causing a controller to execute a method including the steps of receiving an input that corresponds to a user interaction at a remote device and receiving an indication of whether a user is expected to be in proximity to the building controller, wherein: when it is determined that a user is expected to be in proximity to the building controller, a first message latency occurs from when an input is received that corresponds to a user interaction at a remote device and when a message corresponding to that user interaction at the remote device is communicated to the building controller; and when it is determined that a user is not expected to be in proximity to the building controller, a second message latency occurs from when an input is received that corresponds to a user interaction at a remote device and when a message corresponding to that user interaction at the remote device is communicated to the building controller, wherein the second message latency is longer than the first message latency.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which.

Figure 1:
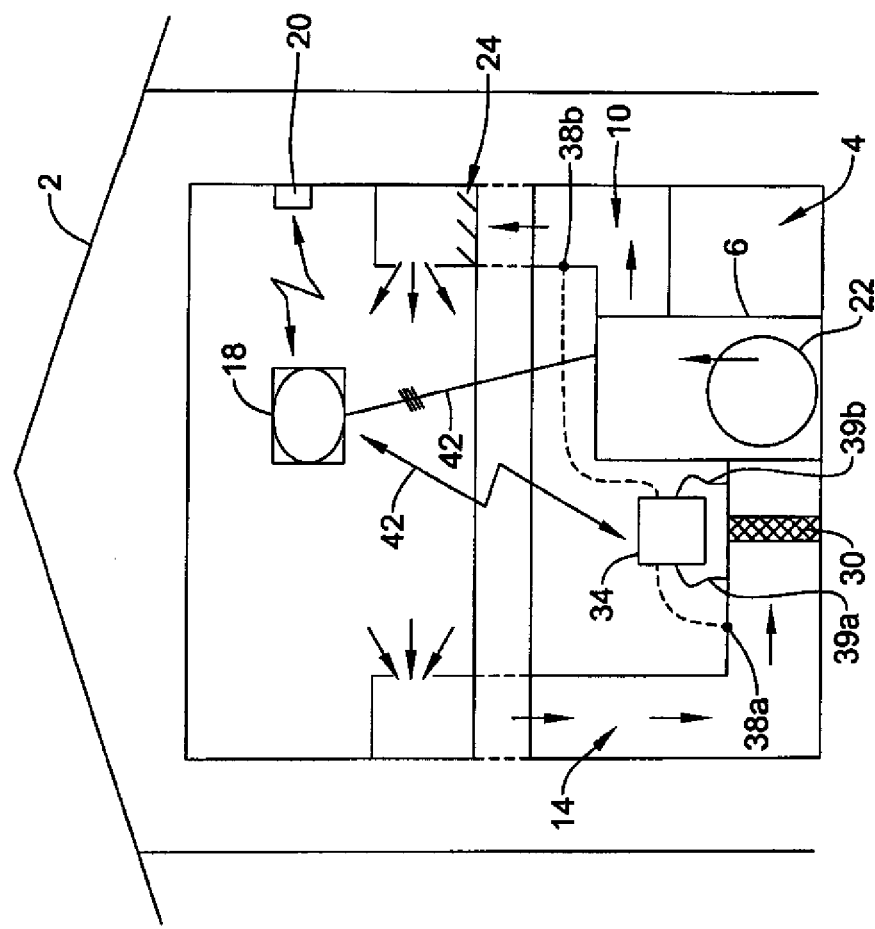
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several embodiments which are meant to be illustrative in nature.

While an HVAC system is used as an example below, it is contemplated that the present disclosure is applicable to any building control system such as a lighting system, a security system, a fire system, a home automation system, and/or any other building control system, as desired.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 20 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.−return air temp.). For the cooling mode, the delta T may be calculated by subtracting the discharge air temperature from the return air temperature (e.g. delta T=return air temp.−discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
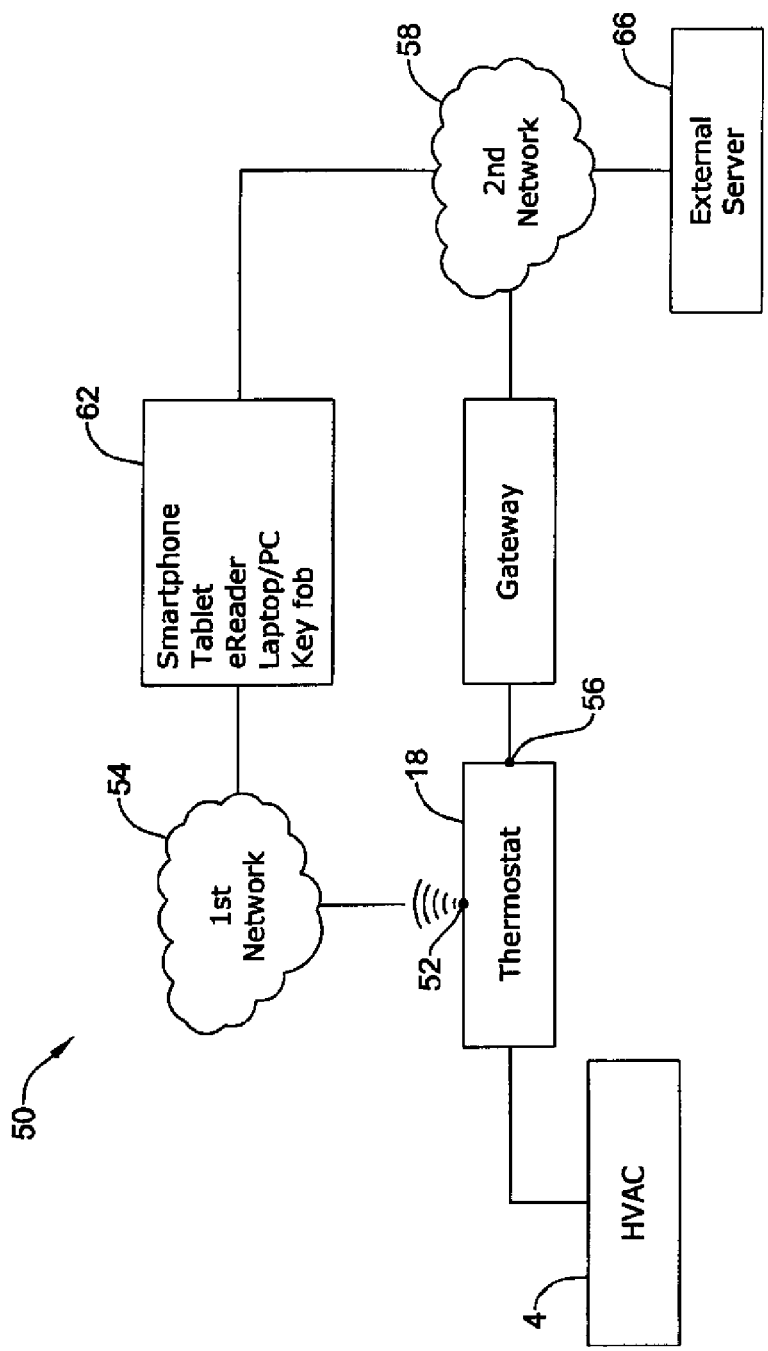
FIG. 2 is a schematic view of an illustrative HVAC control system that may facilitate access and/or control of the HVAC system of FIG. 1.

FIG. 2 is a schematic view of an HVAC control system 50 that facilitates remote access and/or control of the HVAC system 4 shown in FIG. 1. The illustrative HVAC control system 50 includes an HVAC controller, as for example, HVAC controller 18 (see FIG. 1) that is configured to communicate with and control one or more components 6 of the HVAC system 4. As discussed above, the HVAC controller 18 may communicate with the one or more components 6 of the HVAC system 4 via a wired or wireless link. Additionally, the HVAC controller 18 may be adapted to communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web servers 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Depending upon the application and/or where the HVAC user is located, remote access and/or control of the HVAC controller 18 may be provided over the first network 54 and/or the second network 58. A variety of remote, wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote, wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be provided for downloading from the external web service hosted by the external web server 66 (e.g. Honeywell's TOTAL CONNECT™ web service) to which the HVAC controller 18 may also be connected or another external web service (e.g. ITUNES® or Google Play). In some cases, the app may provide a remote user interface for interacting with the HVAC controller 18 at the user's remote device 62. For example, through the user interface provided by the app, a user may be able to change the operating schedule and operating parameter settings such as, for example, temperature set points, humidity set points, start times, end times, schedules, window frost protection settings, and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may then routed to the web server 66 and then from the web server 66 to the remote device 62 where it may reflected by the application program executed by the remote device 62. In other cases, a user may be able to interact with the HVAC controller 18 via a user interface provided by one or more web pages served up by the web server 66. The user may interact with the one or more web pages using a variety of internet capable devices to effect a change at the HVAC controller 18 as well as view usage data and energy consumption data related to the usage of the HVAC system 4. In still yet another case, communication may occur between the user's remote device 62 and the HVAC controller 18 without an intervening server. These are just some examples.

In some cases, the HVAC controller 18 may be programmed to periodically poll the external web server 66 via the second network 58. The rate at which the HVAC controller 18 polls the external web server 66 may control the overall communication rate between the HVAC controller 18, the web server 66, and a user's remote device 62. For example, in many cases, the web server 66 may be programmed to respond to the HVAC controller 18 when it is polled by the HVAC controller 18 over a network such as second network 58. Until that time, the web server 66 may be programmed to buffer any data/commands to be sent to the HVAC controller 18 such as, for example, a set point change or a schedule change. Upon receiving a poll from the HVAC controller 18 via the second network 58, the web server 66 may be programmed to deliver the data in a rapid communication burst to the HVAC controller 18. In general, the faster the polling rate, the more rapidly a response may be received from the web server 66. Because the HVAC controller 18 may be programmed to first poll the web server 66 before it receives any data from the server 66 such as, for example, a set point change which the user may have effected through an app provided on their remote device 62 (or through a web page), the polling rate may be the underlying factor driving the responsiveness between a user's remote device 62, the web server 66, and the HVAC controller 18. The amount of time that passes from when the user interacts with the HVAC controller 18 via their remote device 62 (e.g. the user changes a temperature set point), the interaction is delivered to the HVAC controller 18 from the user's remote device 62 via the web server 66, and when the user actually experiences the change at the HVAC controller 18, may be referred to as message latency. Message latency may also correspond to the amount of time that passes from when the user interacts with the local user interface of the HVAC controller 18 (e.g. the user changes a temperature set point), the interaction is delivered to the user's remote device 62 from the HVAC controller 18 from via the web server 66, and when the user actually experiences the change at the user's remote device 62.

User satisfaction and usability may be associated with the message latency between the HVAC controller 18, the web server 66 and the user's remote device 62. A faster polling rate may be expected to produce lower message latencies, which may be desirable when the user is located in close proximity to the HVAC controller 18 because the user may observe the effect of their interaction with a minimal amount of waiting time.

In some cases, the web server 66 may be configured to periodically poll the HVAC controller 18. In some cases, HVAC controller 18 may be programmed to response to the web server 66 when it is polled by the web server 66 over a network such as second network 58. Until that time, the HVAC controller 18 may be programmed to buffer data/commands to be sent to the web server 66 such as, for example, a set point change or a schedule change made at the HVAC controller 18, a current temperature reading, or an indication of a user's proximity to the HVAC controller 18. Upon receiving a poll from the web server 66 via the second network 58, the HVAC controller 18 may be programmed to deliver the data/commands in a rapid communication burst to the web server 66. As discussed herein, the rate at which the HVAC controller 18 is polled by the external web server 66 may affect the message latency between the HVAC controller 18, the web server 66, and a user's remote device 62. Again, a faster polling rate may be expected to produce lower message latencies.

Figure 3:
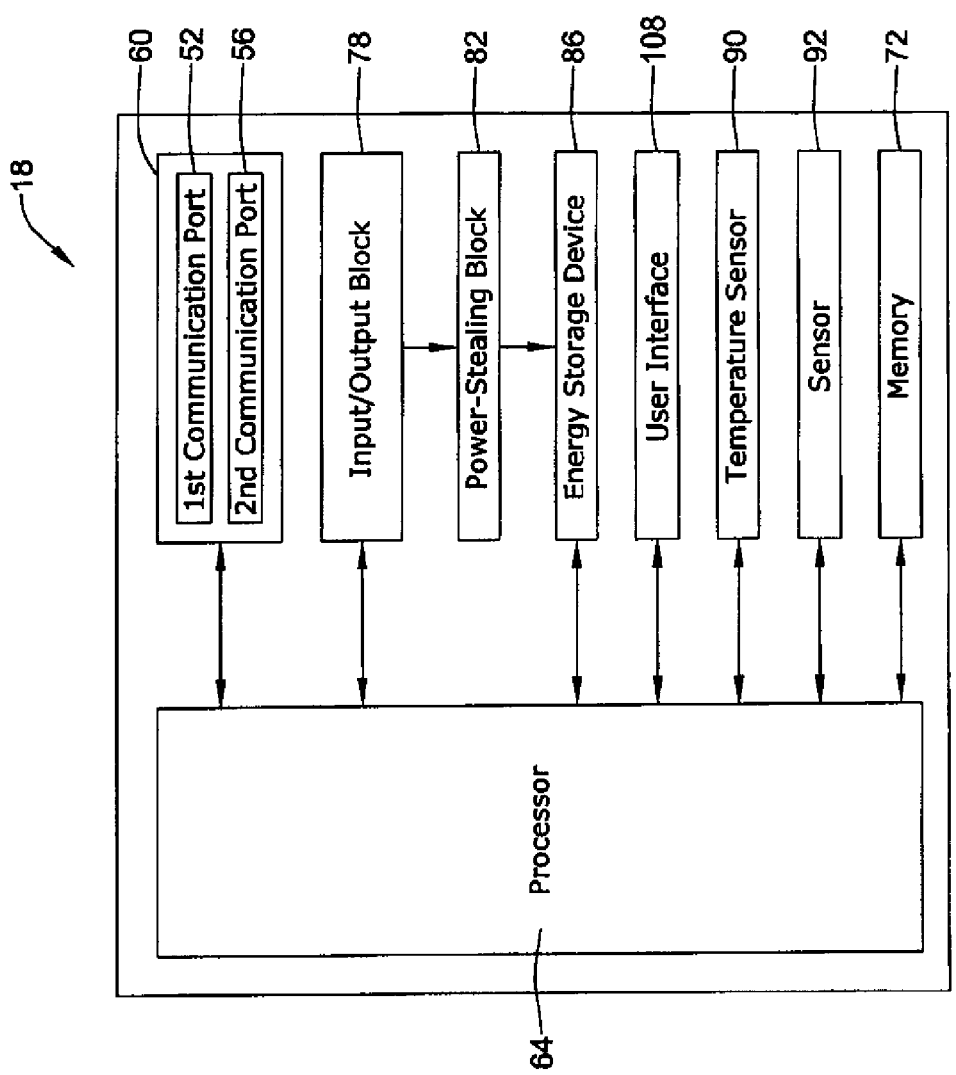
FIG. 3 is a schematic block diagram of an illustrative HVAC controller.

FIG. 3 is a schematic block diagram of illustrative HVAC controller 18 shown in FIG. 2. As discussed above with reference to FIG. 2, the HVAC controller 18 may be accessed and/or controlled from a remote location over the first network 54 and/or the second network 58 using a remote device 62 such as, for example, a smart phone, a tablet computer, a laptop or personal computer, a wireless network-enabled key fob, an e-reader, and/or the like. In some instances, the HVAC controller 18 may be a thermostat, but this is not required. As shown in FIG. 3, the HVAC controller 18 may include a communications block 60 having a first communications port 52 for communicating over a first network (e.g. wireless LAN) and/or a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 108, but this is not required. In some cases, HVAC controller 18 may include a timer (not shown). The timer may be integral to the processor 64 or may be provided as a separate component.

The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

In some cases, an optional power-stealing block 82 may be connected to one or more wires of the I/O block 78, and may be configured to steal power from the one or more wires of the I/O block 78. The power stolen from the one or more wires of the I/O block may be stored in an energy storage device 86 that may be used to at least partially power the HVAC controller 18. The energy storage device 86 may be capacitor or a rechargeable battery. In some instances, the energy storage device may include a non-rechargeable battery. In some cases, the HVAC controller 18 may also include a back-up source of energy such as, for example, a battery that may be used to supplement power supplied to the HVAC controller 18 when the amount of available power stored by the energy storage device 86 is less than optimal or is insufficient to power certain applications.

The HVAC controller 18 may also include one or more sensors such as, for example, a temperature sensor, a humidity sensor, an occupancy sensor, a proximity sensor, and/or the like. In some cases, the HVAC controller 18 may include an internal temperature sensor 90, as shown FIG. 3, but this is not required. The HVAC controller 18 may also communicate with one or more remote temperature sensors, humidity sensors, and/or occupancy sensors located throughout the building or structure. Additionally, the HVAC controller may communicate with a temperature sensor and/or humidity sensor located outside of the building or structure for sensing an outdoor temperature and/or humidity if desired.

In some cases, the HVAC controller 18 may include a sensor 92 that is configured determine if a user is in proximity to the building controller. In some cases, the sensor 92 may be a motion sensor or a proximity sensor such as, for example, a passive infrared (PIR) sensor. In certain cases in which the sensor 92 is a motion sensor or a proximity sensor, the sensor 92 may be located remotely from the HVAC controller 18 and may be in wireless communication with the HVAC controller 18 via one of the communication ports.

In other cases, the sensor 92 may be configured to determine that the user is near or expected to be near the HVAC controller 18 based, at least in part, on the location data provided by a location based service application program executed by a user's remote device 62 that the user utilizes to interact with the HVAC controller 18 from a remote location. The location data generated by the location based services app may be transmitted from the user's remote device 62 directly to the HVAC controller 18 or, in some cases, may be transmitted to the HVAC controller 18 via a server 66 (e.g. Honeywell's TOTAL CONNECT™ server) to which both the HVAC controller 18 and the user's remote device 62 may be connected. In some cases, the sensor 92 may be configured to determine that the user or, more specifically, the user's remote device 62 has crossed a proximity boundary relative to the location of the HVAC controller 18 based on location data provided by the user's remote device that the user utilizes to interact with the HVAC controller 18. The sensor 92 may determine that the user has crossed a proximity boundary by comparing the location data generated by the user's remote device 62 to a predetermined fix location. In some cases, the proximity boundary may be defined by a radius extending outward from the predetermined fix location, and the predetermined fixed location may be the location of the HVAC controller 18.

In yet another example, the sensor 92 may be configured to determine that the user is in proximity to or is expected to be in proximity to the HVAC controller 18 upon detecting that the user's remote device 62 is connected to the building's wireless network which, in some cases, may be the same network to which the HVAC controller 18 is also connected. Such functionality is shown and described in U.S. application Ser. No. 13/559,443 entitled "HVAC CONTROLLER WITH WIRELESS NETWORK BASED OCCUPANCY DETECTION AND CONTROL", the entirety of which is incorporated by reference herein for all purposes.

In still other cases, the sensor 92 is configured to determine that a user is in proximity to the HVAC controller 18 upon sensing a user's interaction with the HVAC controller 18 via the user interface provided at the HVAC controller 18. For example, the sensor 92 may be configured to sense when the screen of the user interface 108 is touched and/or when a button provided at the user interface 108 is pressed by a user. In some cases, the button may be a touch sensitive region provided on the user interface 108 when the user interface 108 incorporates a touch screen display. In other cases, the button may be a hard button or soft key that is provided separate from a display of the user interface 108.

In some cases, upon detecting or determining that a user is in proximity to the HVAC controller, the sensor 92 may deliver a signal to the processor 64 indicating that the user is in proximity to the HVAC controller 18. In other cases, the upon detecting or determining that a user is in proximity to the HVAC controller, the sensor 92 may be configured to transmit a signal to a remote server 66 over a second network 58 via the communications block 60.

Referring now to the processor 64, the processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

Additionally, in some cases, when the HVAC controller 18 is in communication with a web server 66 such as shown in FIG. 2, the processor 64 may be programmed to periodically poll the web server 66, as discussed herein, according to an initial polling rate. The initial polling rate may be set by the manufacturer, installer or user, and may be selected such that it utilizes a minimal amount of energy stored in the energy storage device 86 while at the same time maintains a satisfactory level of communication between the HVAC controller 18 and the web server 66.

During times at which the processor 64 is not polling the web server, the processor 64 may be configured to enter a sleep mode to minimize energy usage. In some cases, upon receiving a signal from the sensor 92 indicating that the user is expected to be in proximity to the HVAC controller or is in proximity to the HVAC controller, the processor 64 may be programmed to increase the polling rate between the HVAC controller 18 and the web server 66. As discussed previously herein, a faster polling rate may result in a lower message latency between the web server 66 and the HVAC controller 18 and, in some cases, between a user's remote device 62, the web server 66 and the HVAC controller 18. A lower message latency may be desirable when the user is located in close proximity to the HVAC controller 18 because the user may observe the effect of their interaction with a minimal amount of waiting time. The processor 64 may be programmed to return to the initial, lower polling rate upon receiving an indication from the sensor 92 that the sensor 92 no longer detects that the user is in proximity to the HVAC controller 18 or when the sensor 92 determines that the user is no longer expected to be in proximity to the HVAC controller. As a result, the message latency between the HVAC controller 18 and the web server and/or the HVAC controller 18, the web server 66, and the user's remote device 62 may be higher when the sensor 92 determines that the user is not in proximity to or is not expected to be in proximity to the HVAC controller 18. Because a higher polling rate utilizes more energy, increasing the polling rate only in response to when the user is determined to be or expected to be in proximity to the HVAC controller 18 may be a useful in managing, if not reducing, the overall power consumption of the HVAC controller 18 while at the same time providing a higher level of user satisfaction by providing lower message latencies when the user is in proximity to the HVAC controller 18.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

The user interface 108, when provided, may be any suitable user interface that permits the HVAC controller 18 to display and/or solicit information, as well as accept one or more user interactions with the HVAC controller 18. For example, the user interface 108 may permit a user to locally enter data such as temperature set points, humidity set points, starting times, ending times, schedule times, diagnostic limits, responses to alerts, and the like. In one embodiment, the user interface 108 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 108 may be a touch screen LCD panel that functions as both display and keypad. The touch screen LCD panel may be adapted to solicit values for a number of operating parameters and/or to receive such values, but this is not required. In still other cases, the user interface 108 may be a dynamic graphical user interface.

In some instances, the user interface 108 need not be physically accessible to a user at the HVAC controller 18. Instead, the user interface 108 may be a virtual user interface that is accessible via the first network 54 and/or second network 58 using a mobile wireless device such as one of those remote devices 62 previously described herein. In some cases, the virtual user interface may be provided by an app running on a user's remote device for the purposes of remotely interacting with the HVAC controller 18. Through the virtual user interface provided by the app on the user's remote device 62, the user may change temperature set points, humidity set points, starting times, ending times, schedule times, diagnostic limits, respond to alerts, update their user profile, view energy usage data, and/or the like. Changes made using an app on the user's remote device 62 may first be transmitted to an external web server 66. The external web server 66 may receive the user inputs entered, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 58 to the HVAC controller 18 where it is received via the second communications port 56 and may be stored in the memory 72 for execution by the processor 64. In some cases, the user may observe the effect of their input via the user interface 108 of the HVAC controller 18. As discussed herein, if the sensor 92 determines that the user is near or is expected to be near the HVAC controller 18, then the user may experience a lower message latency from when the user interacts with the user interface of their remote device 62 to effect a change at the HVAC controller 18 and when a message corresponding to the user's interaction with the remote device 62 is communicated to the HVAC controller 18.

In some cases, the user may remotely interact with the HVAC controller 18 via one or more web pages. The one or more web pages may be hosted by an external web service 66 and associated with a user account having one or more user profiles. The external web server 66 may receive and accept user inputs entered via the one or more web pages. If the user inputs include changes to the existing control algorithm including temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 58 to the HVAC controller 18 where it is received via the second communications port 56 and may be stored in the memory 72 for execution by the processor 64. In some cases, the user may observe the effect of their inputs entered via the one or more web pages at the user interface of the HVAC controller 18. As discussed herein, if the sensor 92 determines that the user is near or is expected to be near the HVAC controller 18, then the user may experience a lower message latency.

In some cases, a user may utilize either the local user interface 108 provided at the HVAC controller 18 or a remote virtual user interface as described herein. The two types of user interfaces that may be used to interact with the HVAC controller 18 are not mutually exclusive of one another. However, in some cases, the virtual user interface may provide more advanced capabilities to the user.

Figure 4:
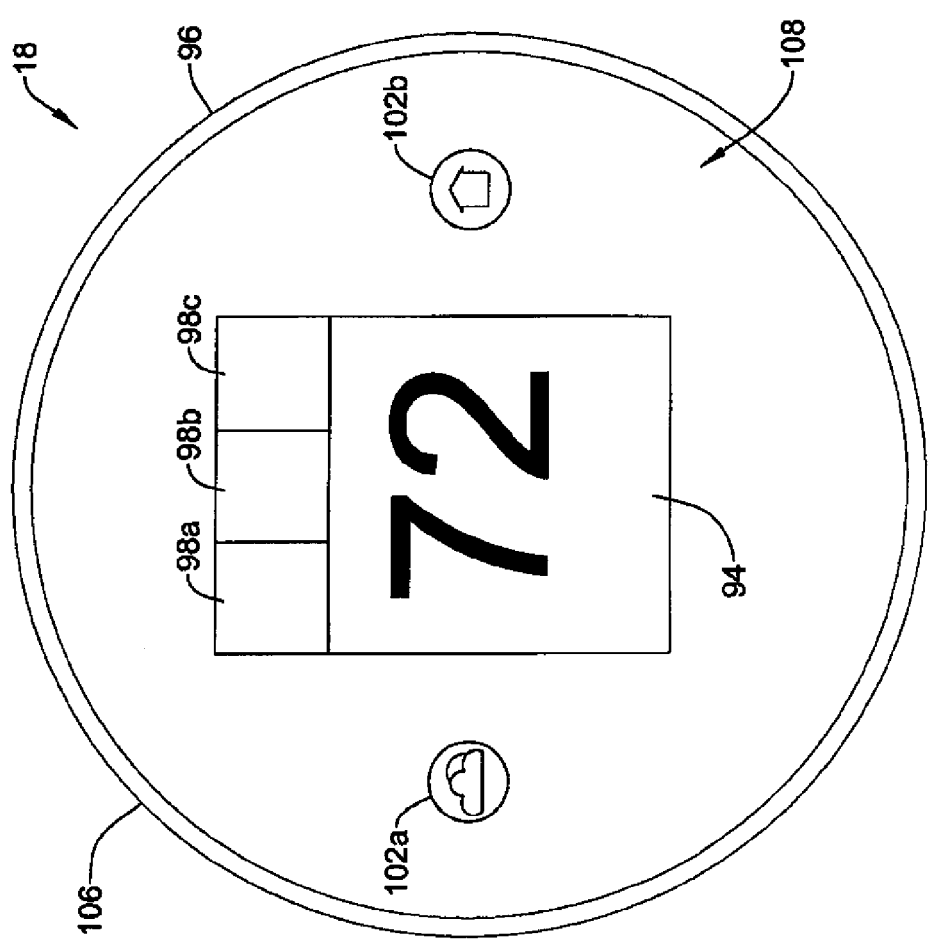
FIG. 4 is a front, schematic view of an illustrative HVAC controller.

FIG. 4 is a front view of an illustrative HVAC controller 18 including a local user interface 108. The local user interface 108 may be provided in addition or in alternative to a virtual user interface that may be provided by an application program executed by a user's remote device 62 or that may be viewed as one or more web pages served up by a web server 66, as discussed herein. As shown in FIG. 4, the local user interface 108 may include a display 94 disposed within a housing 96. In some cases, the display 94 may be a touch screen display. The user interface 108 may include one or more touch sensitive regions 98a-98c provided on the display 94, each touch sensitive region defining a button through which the user may interact with the HVAC controller 18. Alternatively, or in addition, the user interface 108 may include one or more buttons 102a and 102b that may be provided separate from the display 94 through which the user may interact with the HVAC controller 18. In some cases, the buttons 102a, 102b may be touch sensitive capacitive buttons. In other cases, the buttons 102a, 102b may be hard, physical buttons or soft keys. It will be generally understood that the size and shape of the display as well as the number and location of the various buttons can vary.

The housing 96 may be fabricated from any suitable material. As shown in FIG. 4, the housing 96 may have a cylindrical shape with a generally circular foot print, but this is not required. In some cases, the housing 96 may be a two-part housing and may include a rotating ring 106 which may form at part of the user interface 108, and which may provide another mechanism for accepting an input from a user. For example, the user may rotate the ring 106 to increase or decrease an operating parameter set point or to change information viewed on the display 94 by advancing from a first screen to a second screen displayed on the display 94. In some cases, while the user interface 108 that is provided at the HVAC controller 18 is capable of receiving a user's interactions, a more advanced or detailed user interface for more fully interacting with the HVAC controller 18 may be provided by an application program executed at a user's remote device 62 or by one or more web pages served up by a web server such as web server 66, as described herein.

Figure 5:
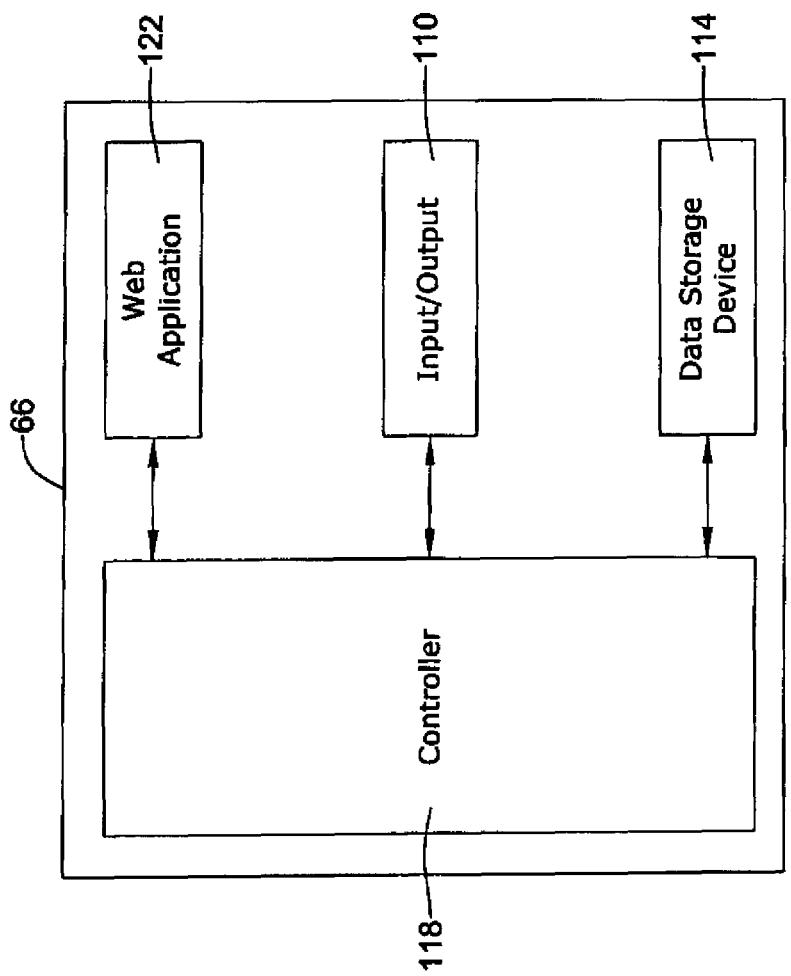
FIG. 5 is a schematic block diagram of an illustrative web server.

FIG. 5 is schematic view of an illustrative web server 66 that may be used to communicate with a HVAC controller such as, HVAC controller 18, discussed herein. The web server 66 may be a dedicated web server 66 such as, for example, Honeywell's TOTAL CONNECT™ web server that provides a web service in which both the HVAC controller 18 and the user's remote device 62 may be enrolled. The web server 66 may be coupled to the HVAC controller 18 over the second network 58 via a gateway and/or via a local area network located within the user's home such as described above (see, for example, FIG. 2). Additionally, the web server 66 may be accessed by a user over the second network 58 using a remote device 62.

As shown in FIG. 5, the web server 66 may include at least one input/output port 110 for sending and/or receiving data over second network 58 to and from the HVAC controller 18 and/or the user's remote device 62. The web server 66 may also include a data storage device 114, and a controller 118 coupled to the input/output port 110 and the data storage device 114. In some cases, the controller 118 may be configured to implement a web application 122 for serving up one or more web pages over the second network 58 via the input/output port 110. The one or more web pages may be accessed and viewed by a user through the user interface of any number of internet capable or WiFi-enabled remote devices such as, for example, a user's smart phone or tablet computer using a standard web browser. In some cases, the one or more web pages may provide a virtual user interface for controlling the HVAC controller 18. Through the one or more web pages forming the virtual user interface, a user may enter or change various HVAC operating parameters including, but not limited, to temperature set points, humidity set points, starting times, ending times, schedule times, diagnostic limits, and/or the like, as well as respond to one or more alerts.

In other cases, the web server 66 may facilitate communication between a user's remote device 62 and the HVAC controller 18. For example, a user may make a change to the HVAC controller 18 through the user interface provided by an app executed by their remote device 62. This change may be transmitted from the user's remote device 62 to the web server 66. The web server 66 may then communicate a corresponding message to the HVAC controller 18. Similarly, if a change to the HVAC controller 18 is made via the local user interface of the HVAC controller 18, a message indicating the change may be transmitted from the HVAC controller 18 to the server 66, and a corresponding message may be sent from the server 66 to the user's remote device where the change may be reflected by an app executed by the user's remote device.

In some cases, the web server 66 may be further configured to receive location data from a location based services app executed by the user's remote device 62. The controller 118 may be configured to utilize the location data from the user's remote device 62 to predict and/or determine when the user is in proximity to or is expected to be in proximity to the HVAC controller 18. In some cases, the server 66 may be configured to determine that the user or, more specifically, the user's remote device 62 has crossed a proximity boundary by comparing the location data transmitted from the user's remote device 62 to the web server 66 to a predetermined fixed location. The predetermined fixed location may be the location of the HVAC controller 18 or the location of the building in which the HVAC controller 18 is located, and the proximity boundary may be defined by a radius extending outward from the predetermined fixed location. The server 66 may be configured to transmit a data packet to the HVAC controller 18 to the HVAC controller 18 indicating as to when the user is in proximity to or is expected to be in proximity to the HVAC controller 18 which may cause a communication rate between the HVAC controller 18 and the server 66 to be increased. This may result in a lower message latency between the user's remote device 62, the web server 66 and the HVAC controller.

Similarly, the server 66 may be configured to utilize the location data from the user's remote device to predict and/or determine when the user is expected to no longer be in proximity to the HVAC controller 18. The server 66 may be configured to transmit a data packet to the HVAC controller 18 to the HVAC controller 18 indicating as to when the user is no longer in proximity to or is no longer expected to be in proximity to the HVAC controller 18, which may cause the message latency to be increased. In some cases, as discussed herein, the HVAC controller 18 and/or the web server 66 may control the polling rate between the HVAC controller 18 and the web server 66, responsive to the user's proximity to the HVAC controller 18. Regardless of which device controls the polling rate, upon receiving a determination that the user is in proximity to or is expected to be in proximity to the HVAC controller 18, the communication rate between the HVAC controller 18 and the web server 66 may be increased, which may lower the message latency between the user's remote device, the web server 66, and the HVAC controller 18. This may enhance the overall satisfaction of the user as the user may perceive the HVAC controller 18 as being more responsive when the user effects at change at their remote device 62. Similarly, this may enhance the overall satisfaction of the user as the remote device 62 may appear to be more responsive to showing the changes made at the local user interface of the HVAC controller 18.

Increasing the polling rate in response to when the user is determined to be or expected to be in proximity to the HVAC controller 18 may be useful in managing, if not reducing, the overall power consumption of the HVAC controller 18 because the a higher polling rate, which consumes more energy, need not be maintained a majority of the time.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A building controller comprising:
an input/output block configured to send one or more control signals to control one or more building components;
a communications port configured to send and/or receive messages via a communications network;
a user interface;
a sensor used to determine if a user is in proximity to the building controller; and
a controller operatively coupled to the input/output block, the communications port, the user interface and the sensor, the controller configured to communicate via the communications port, wherein:
when the sensor detects that a user is in proximity to the building controller, a first message latency occurs from when a user interacts with a remote device to interact with the building controller and when a message corresponding to that user interaction at the remote device is communicated to the building controller; and
when the sensor does not detect that a user is in proximity to the building controller, a second message latency occurs from when a user interacts with a remote device to interact with the building controller and when a message corresponding to that user interaction at the remote device is communicated to the building controller;
wherein the second message latency is longer than the first message latency.

2. The building controller according to claim 1, wherein the sensor comprises a motion sensor.

3. The building controller according to claim 1, wherein the sensor comprises a passive infrared sensor.

4. The building controller according to claim 1, wherein the user interface comprises one or more buttons, wherein the sensor corresponds to sensing when a button is interacted with by a user.

5. The building controller according to claim 4, wherein the button is a touch region on a touch screen display.

6. The building controller according to claim 4, wherein the button is separate from a display.

7. The building controller according to claim 1, wherein the user interface comprises a display.

8. The building controller according to claim 1, wherein the communications port is a wireless communications port for communicating over a wireless network.

9. The building controller according to claim 1, further comprising a energy storage device, wherein the energy storage device is configured to provide power to the building controller at least some of the time.

10. The building controller according to claim 9, wherein the energy storage device is rechargeable.

11. The building controller of claim 1, further comprising a power source that derives energy from energy harvesting.

12. The building controller of claim 1, wherein the controller is configured to communicate an indication of whether the sensor detects that a user is in proximity to the building controller.

13. The building controller of claim 1, wherein the controller is configured to communicate an indication of whether the sensor detects that a user is not in proximity to the building controller.

14. The building controller of claim 1, further comprising a temperature sensor, and wherein the input/output block is configured to send one or more control signals to control one or more HVAC components.

15. The building controller of claim 1, wherein the controller is configured to communicate via the communications port at a first communication rate when the sensor detects that a user is in proximity to the building controller, and wherein the controller is configured to communicate via the communications port at a second communication rate when the sensor does not detect that a user is in proximity to the building controller, wherein the first communication rate is greater than the second communication rate.

16. A method for reducing power consumption of a building controller, wherein the building controller is configured to be manipulated by a user from a remote device by receiving one or more messages that correspond to user interaction at the remote device, the method comprising:

determining if a user is expected to be in proximity to the building controller;

when it is determined that a user is expected to be in proximity to the building controller, a first message latency occurs from when a user interacts with the remote device and when a message corresponding to that user interaction at the remote device is communicated to the building controller; and when it is determined that a user is not expected to be in proximity to the building controller, a second message latency occurs from when a user interacts with a remote device and when a message corresponding to that user interaction at the remote device is communicated to the building controller, wherein the second message latency is longer than the first message latency.

17. The method according to claim 16, wherein determining if the user is expected to be in proximity to the building controller comprises receiving location data from the remote device and comparing a location of the user to a location of the building controller based, at least in part, on the location data.

18. The method according to claim 17, further comprising determining if the user has crossed a proximity boundary relative to the location of the building controller.

19. The method according to claim 16, wherein determining if the user is expected to be in proximity to the building controller comprises determining if the remote device has joined a network to which the building controller is connected.

20. A non-transitory computer readable medium comprising a set of instructions stored thereon, the instructions causing a server comprising a controller to execute a method comprising:

receiving an input that corresponds to a user interaction at a remote device;

receiving an indication of whether a user is expected to be in proximity to a building controller;

when it is determined that a user is expected to be in proximity to the building controller, a first message latency occurs from when an input is received that corresponds to a user interaction at a remote device and when a message corresponding to that user interaction at the remote device is communicated to the building controller; and when it is determined that a user is not expected to be in proximity to the building controller, a second message latency occurs from when an input is received that corresponds to a user interaction at a remote device and when a message corresponding to that user interaction at the remote device is communicated to the building controller, wherein the second message latency is longer than the first message latency.

21. The computer readable medium according to claim 20, further comprising increasing the communication rate between the building controller and the server when it is determined that the user is expected to be in proximity to the building controller.

* * * * *